(12) United States Patent
Alizadeh-Shabdiz

(10) Patent No.: US 8,130,148 B2
(45) Date of Patent: Mar. 6, 2012

(54) SYSTEM AND METHOD FOR USING A SATELLITE POSITIONING SYSTEM TO FILTER WLAN ACCESS POINTS IN A HYBRID POSITIONING SYSTEM

(75) Inventor: Farshid Alizadeh-Shabdiz, Wayland, MA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

(21) Appl. No.: 13/209,629

(22) Filed: Aug. 15, 2011

(65) Prior Publication Data

US 2011/0298659 A1  Dec. 8, 2011

Related U.S. Application Data

(63) Continuation of application No. 12/479,734, filed on Jun. 5, 2009, now Pat. No. 7,999,742.

(60) Provisional application No. 61/059,580, filed on Jun. 6, 2008.

(51) Int. Cl.
G01S 3/02 (2006.01)
(52) U.S. Cl. ........................................ 342/463
(58) Field of Classification Search .................. 342/463
See application file for complete search history.

(56) References Cited

U.S. PATENT DOCUMENTS

| | | | |
|---|---|---|---|
| 5,420,592 A | 5/1995 | Johnson | |
| 5,936,572 A | 8/1999 | Loomis et al. | |
| 5,943,606 A | 8/1999 | Kremm et al. | |
| 5,999,124 A | 12/1999 | Sheynblat | |
| 6,185,427 B1 | 2/2001 | Krasner et al. | |
| 6,262,741 B1 | 7/2001 | Davies | |
| 6,272,405 B1 | 8/2001 | Kubota et al. | |
| 6,420,999 B1 | 7/2002 | Vayanos | |
| 6,574,557 B2 | 6/2003 | Endo | |
| 6,587,692 B1 | 7/2003 | Chen et al. | |
| 6,625,647 B1 | 9/2003 | Barrick, Jr. et al. | |
| 6,665,658 B1 | 12/2003 | DaCosta et al. | |
| 6,678,611 B2 | 1/2004 | Khavakh et al. | |
| 6,707,422 B2 | 3/2004 | Sheynblat et al. | |
| 6,725,158 B1 | 4/2004 | Sullivan et al. | |
| 6,741,188 B1 | 5/2004 | Miller et al. | |
| 6,771,211 B2 | 8/2004 | Syrjarinne et al. | |
| 6,888,811 B2 | 5/2005 | Eaton et al. | |

(Continued)

FOREIGN PATENT DOCUMENTS

WO  WO-2005/004527 A1  1/2005

(Continued)

OTHER PUBLICATIONS

Griswold, et al., "ActiveCamus—Sustaining Educational Communities through Mobile Technology." UCSD CSE Technical Report #CS200-0714, 2002, 19 pages.

(Continued)

*Primary Examiner* — Harry Liu
(74) *Attorney, Agent, or Firm* — Wilmer Cutler Pickering Hale and Dorr LLP

(57) ABSTRACT

This disclosure describes a system and method for using a satellite positioning system to filter WLAN access points in a hybrid positioning system. In some embodiments, the method can include detecting WLAN APs in range of the WLAN and satellite enabled device, obtaining satellite measurements from at least two satellites to provide a plurality of possible satellite locations of the device, and providing a weight for each AP based on the distance from the WLAN APs to the possible satellite locations of the device.

32 Claims, 15 Drawing Sheets

U.S. PATENT DOCUMENTS

| | | |
|---|---|---|
| 6,894,645 B1 | 5/2005 | Akopian et al. |
| 6,928,292 B2 | 8/2005 | Tsunehara et al. |
| 6,978,023 B2 | 12/2005 | Dacosta |
| 7,120,449 B1 | 10/2006 | Muhonen et al. |
| 7,123,928 B2 | 10/2006 | Moeglein et al. |
| 7,130,646 B2 | 10/2006 | Wang |
| 7,167,715 B2 | 1/2007 | Stanforth |
| 7,167,716 B2 | 1/2007 | Kim et al. |
| 7,221,928 B2 | 5/2007 | Laird et al. |
| 7,236,126 B2 | 6/2007 | Jeon et al. |
| 7,250,907 B2 | 7/2007 | Krumm et al. |
| 7,254,405 B2 | 8/2007 | Lin et al. |
| 7,305,245 B2 | 12/2007 | Alizadeh-Shabdiz et al. |
| 7,313,402 B1 | 12/2007 | Rahman |
| 7,397,424 B2 | 7/2008 | Houri |
| 7,403,762 B2 | 7/2008 | Morgan et al. |
| 7,414,988 B2 | 8/2008 | Jones et al. |
| 7,433,694 B2 | 10/2008 | Morgan et al. |
| 7,471,954 B2 | 12/2008 | Brachet et al. |
| 7,474,897 B2 | 1/2009 | Morgan et al. |
| 7,479,922 B2 | 1/2009 | Hunt et al. |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz et al. |
| 7,545,894 B2 | 6/2009 | Ziedan et al. |
| 7,551,579 B2 | 6/2009 | Alizadeh-Shabdiz et al. |
| 7,551,929 B2 | 6/2009 | Alizadeh-Shabdiz et al. |
| 7,587,081 B2 | 9/2009 | Rovira-Mas et al. |
| 7,595,754 B2 | 9/2009 | Mehta |
| 7,664,511 B2 | 2/2010 | Wang et al. |
| 7,683,835 B2 | 3/2010 | Sharma |
| 7,724,612 B2 | 5/2010 | Azim |
| 7,768,963 B2 | 8/2010 | Alizadeh-Shabdiz |
| 7,769,396 B2 | 8/2010 | Alizadeh-Shabdiz et al. |
| 7,818,017 B2 | 10/2010 | Alizadeh-Shabdiz et al. |
| 7,822,427 B1 | 10/2010 | Hou |
| 7,835,754 B2 | 11/2010 | Alizadeh-Shabdiz et al. |
| 7,848,733 B2 | 12/2010 | Bull et al. |
| 7,856,234 B2 | 12/2010 | Alizadeh-Shabdiz et al. |
| 7,916,661 B2 | 3/2011 | Alizadeh-Shabdiz et al. |
| 7,999,742 B2 | 8/2011 | Alizadeh-Shabdiz |
| 2001/0053999 A1 | 12/2001 | Feinberg |
| 2002/0055956 A1 | 5/2002 | Krasnoiarov et al. |
| 2002/0173317 A1 | 11/2002 | Nykanen et al. |
| 2003/0011511 A1 | 1/2003 | King et al. |
| 2003/0043073 A1 | 3/2003 | Gray et al. |
| 2003/0125045 A1 | 7/2003 | Riley et al. |
| 2003/0197645 A1 | 10/2003 | Ninomiya et al. |
| 2003/0225893 A1 | 12/2003 | Roese et al. |
| 2004/0019679 A1 | 1/2004 | E et al. |
| 2004/0023669 A1 | 2/2004 | Reddy |
| 2004/0039520 A1 | 2/2004 | Khavakh et al. |
| 2004/0081133 A1 | 4/2004 | Smavatkul et al. |
| 2004/0087317 A1 | 5/2004 | Caci |
| 2004/0157624 A1 | 8/2004 | Hrastar |
| 2004/0203847 A1 | 10/2004 | Knauerhase et al. |
| 2004/0205234 A1 | 10/2004 | Barrack et al. |
| 2005/0017898 A1 | 1/2005 | Teranishi |
| 2005/0020266 A1 | 1/2005 | Backes et al. |
| 2005/0037775 A1 | 2/2005 | Moeglein et al. |
| 2005/0090266 A1 | 4/2005 | Sheynblat |
| 2005/0192024 A1 | 9/2005 | Sheynblat |
| 2005/0237967 A1 | 10/2005 | Lee et al. |
| 2005/0285783 A1 | 12/2005 | Harper |
| 2006/0009235 A1 | 1/2006 | Sheynblat et al. |
| 2006/0040640 A1 | 2/2006 | Thompson et al. |
| 2006/0046709 A1 | 3/2006 | Krumm et al. |
| 2006/0078122 A1 | 4/2006 | Dacosta |
| 2006/0089157 A1 | 4/2006 | Casey et al. |
| 2006/0089160 A1 | 4/2006 | Othmer |
| 2006/0095348 A1 | 5/2006 | Jones et al. |
| 2006/0095349 A1 | 5/2006 | Morgan et al. |
| 2006/0170591 A1 | 8/2006 | Houri |
| 2006/0197704 A1 | 9/2006 | Luzzatto et al. |
| 2006/0200843 A1 | 9/2006 | Morgan et al. |
| 2006/0217131 A1 | 9/2006 | Alizadeh-Shabdiz et al. |
| 2006/0221918 A1 | 10/2006 | Wang |
| 2006/0240840 A1 | 10/2006 | Morgan et al. |
| 2007/0004428 A1 | 1/2007 | Morgan et al. |
| 2007/0052583 A1 | 3/2007 | Zhodzishsky et al. |
| 2007/0097511 A1 | 5/2007 | Das et al. |
| 2007/0100955 A1 | 5/2007 | Bodner |
| 2007/0109184 A1 | 5/2007 | Shyr et al. |
| 2007/0121560 A1 | 5/2007 | Edge |
| 2007/0126635 A1 | 6/2007 | Houri |
| 2007/0150516 A1 | 6/2007 | Morgan et al. |
| 2007/0167174 A1 | 7/2007 | Halcrow et al. |
| 2007/0232892 A1 | 10/2007 | Alizadeh-Shabdiz et al. |
| 2007/0258420 A1 | 11/2007 | Alizadeh-Shabdiz et al. |
| 2007/0268177 A1 | 11/2007 | Ahmed et al. |
| 2007/0298761 A1 | 12/2007 | Bani Hani |
| 2008/0004888 A1 | 1/2008 | Davis et al. |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008121 A1 | 1/2008 | Alizadeh-Shabdiz |
| 2008/0032706 A1 | 2/2008 | Sheynblat et al. |
| 2008/0033646 A1 | 2/2008 | Morgan et al. |
| 2008/0079633 A1 | 4/2008 | Pon et al. |
| 2008/0111737 A1 | 5/2008 | Haverkamp et al. |
| 2008/0133336 A1 | 6/2008 | Altman et al. |
| 2008/0158053 A1 | 7/2008 | Watanabe |
| 2008/0176583 A1 | 7/2008 | Brachet et al. |
| 2008/0214192 A1 | 9/2008 | Soliman |
| 2008/0234533 A1 | 9/2008 | Vollum |
| 2008/0248741 A1 | 10/2008 | Alizadeh-Shabdiz |
| 2008/0248808 A1 | 10/2008 | Alizadeh-Shabdiz |
| 2008/0261615 A1 | 10/2008 | Kalhan |
| 2009/0002237 A1 | 1/2009 | Nonoyama |
| 2009/0042557 A1 | 2/2009 | Vardi et al. |
| 2009/0075672 A1 | 3/2009 | Jones et al. |
| 2009/0121927 A1 | 5/2009 | Moshfeghi |
| 2009/0149197 A1 | 6/2009 | Morgan et al. |
| 2009/0161806 A1 | 6/2009 | Ananny et al. |
| 2009/0168843 A1 | 7/2009 | Waters et al. |
| 2009/0175189 A1 | 7/2009 | Alizadeh-Shabdiz et al. |
| 2009/0181695 A1 | 7/2009 | Wirola et al. |
| 2009/0189810 A1 | 7/2009 | Murray |
| 2009/0196267 A1 | 8/2009 | Walker, Sr. |
| 2009/0231191 A1 | 9/2009 | Wu et al. |
| 2009/0251364 A1 | 10/2009 | Lorenz |
| 2009/0252138 A1 | 10/2009 | Alizadeh-Shabdiz et al. |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0303120 A1 | 12/2009 | Alizadeh-Shabdiz |
| 2009/0303121 A1 | 12/2009 | Alizadeh-Shabdiz |
| 2009/0310585 A1 | 12/2009 | Alizadeh-Shabdiz |
| 2009/0312035 A1 | 12/2009 | Alizadeh-Shabdiz |
| 2009/0312036 A1 | 12/2009 | Alizadeh-Shabdiz |
| 2010/0039323 A1 | 2/2010 | Kosolobov et al. |
| 2010/0052983 A1 | 3/2010 | Alizadeh-Shabdiz |
| 2010/0195632 A1 | 8/2010 | Prabhu |
| 2010/0309051 A1 | 12/2010 | Moshfeghi |
| 2011/0012780 A1 | 1/2011 | Alizadeh-Shabdiz |
| 2011/0012784 A1 | 1/2011 | Alizadeh-Shabdiz |
| 2011/0021207 A1 | 1/2011 | Morgan et al. |
| 2011/0035420 A1 | 2/2011 | Alizadeh-Shabdiz et al. |
| 2011/0045840 A1 | 2/2011 | Alizadeh-Shabdiz et al. |
| 2011/0058495 A1 | 3/2011 | Alizadeh-Shabdiz et al. |
| 2011/0074626 A1 | 3/2011 | Alizadeh-Shabdiz et al. |
| 2011/0080317 A1 | 4/2011 | Alizadeh-Shabdiz et al. |
| 2011/0080318 A1 | 4/2011 | Alizadeh-Shabdiz et al. |
| 2011/0080841 A1 | 4/2011 | Alizadeh-Shabdiz et al. |
| 2011/0164522 A1 | 7/2011 | Alizadeh-Shabdiz et al. |
| 2011/0235532 A1 | 9/2011 | Alizadeh-Shabdiz et al. |
| 2011/0235623 A1 | 9/2011 | Alizadeh-Shabdiz et al. |
| 2011/0287783 A1 | 11/2011 | Alizadeh-Shabdiz et al. |
| 2011/0306357 A1 | 12/2011 | Alizadeh-Shabdiz et al. |
| 2011/0306358 A1 | 12/2011 | Alizadeh-Shabdiz et al. |
| 2011/0306359 A1 | 12/2011 | Alizadeh-Shabdiz et al. |
| 2011/0306360 A1 | 12/2011 | Alizadeh-Shabdiz et al. |
| 2011/0306361 A1 | 12/2011 | Alizadeh-Shabdiz et al. |

FOREIGN PATENT DOCUMENTS

| | | |
|---|---|---|
| WO | WO-2008/006077 A2 | 1/2008 |
| WO | WO-2009/149417 | 12/2009 |
| WO | WO-2010/005731 | 1/2010 |
| WO | WO-2011/008613 | 1/2011 |
| WO | WO-2011/041298 | 4/2011 |
| WO | WO-2011/041430 | 4/2011 |

OTHER PUBLICATIONS

Hazas, M., et al., "location-Aware Computing Comes of Age," IEEE, vol. 37, Feb. 2004, 3 pages.

Hellebrandt, M., et al., "Estimating Position and Velocity of Mobile in a Cellular Radio Network," IEEE Transactions on Vehicular Technology, vol. 46, No. 1, Feb. 1997, 7 pages.

International Search Report and Written Opinion of the International Searching Authority for PCT/US2009/046504, mailed Oct. 7, 2009, 12 pages.

International Search Report and Written Opinion of the International Searching Authority for PCT/US2009/047527, 10 pages.

International Search Report and Written Opinion of the International Searching Authority of the United States Patent and Trademark Office for PCT/US2010/041282, mailing date of Aug. 30, 2010, 8 pages.

International Search Report and Written Opinion of the International Searching Authority, mailing date Aug. 18, 2009 for PCT/US09/047527, 10 pages.

International Search Report and Written Opinion of the International Searching Authority, the United States Patent and Trademark Office, for International Application No. PCT/US2010/050511, dated Dec. 30, 2010, 8 pages.

International Search Report and Written Opinion of the International Searching Authority, the United States Patent and Trademark Office, for International Application No. PCT/US2010/050742, dated Dec. 3, 2010, 9 pages.

Kim, M., et al., "Risks of Using AP locations discovered through war driving," Lecture Notes in Computer Science, vol. 3968, 2006, 15 pages.

Kirsner, S., "One more way to find yourself," The Boston Globe, May 23, 2005, Retrieved from www.boston.com, 2 pages.

Krumm, J., et al., "LOCADIO: Interferring Motion and Location from Wi-Fi Signal Strengths," First Annual International Conference and Mobile and Ubiquitous Sytstems: Networking and Services, Aug. 2004, 10 pages.

LaMarca, A., et al., "Place Lab: Device Positioning Using Radio Beacons in the Wild," Intel Corporation, 2004, 20 pages.

Muthukrishnan, K., et al., "Towards Smart Surroundings: Enabling Techniques and Technologies for Localization," Lecture Notes in Computer Science, vol. 3479, May 2005, 11 pages.

Wikipedia, "Dilution of Precision (GPS)," May 2009, 3 pages.

SYSTEM AND METHOD FOR USING A SATELLITE POSITIONING SYSTEM TO FILTER WLAN ACCESS POINTS IN A HYBRID POSITIONING SYSTEM

CROSS-REFERENCE TO RELATED APPLICATIONS

This application is a continuation of U.S. patent application Ser. No. 12/479,734, entitled System And Method For Using A Satellite Positioning System To Filter WLAN Access Points In A Hybrid Positioning System, filed Jun. 5, 2009, now U.S. Pat. No. 7,999,742, which claims the benefit under 35 U.S.C. §119(e) of U.S. Provisional Application No. 61/059,580, filed on Jun. 6, 2008, entitled Integrated WLAN-based and Satellite-based Positioning System, both incorporated by reference herein in their entirety.

This application is related to the following references:

U.S. patent application Ser. No. 12/479,718, filed Jun. 5, 2009 and entitled "Method and System for Determining Location Using a Hybrid Satellite and WLAN Positioning System by Selecting the Best WLAN-PS Solution;"

U.S. patent application Ser. No. 12/479,721, filed Jun. 5, 2009 and entitled "Systems and methods for Using Environmental Information in a Hybrid Positioning System;"

U.S. patent application Ser. No. 12/479,722, filed Jun. 5, 2009 and entitled "Systems and Methods for Maintaining Clock Bias Accuracy in a Hybrid Positioning System;"

U.S. patent application Ser. No. 12/479,723, filed Jun. 5, 2009 and entitled "System and Method for Refining a WLAN-PS Estimated Location Using Satellite Measurements in a Hybrid Positioning System;"

U.S. patent application Ser. No. 12/479,724, filed Jun. 5, 2009 and entitled "Systems and Methods for Determining Position Using a WLAN-PS Estimated Position as an Initial Position in a Hybrid Positioning System;"

U.S. patent application Ser. No. 12/479,727, filed Jun. 5, 2009 and entitled "Methods and Systems for Improving the Accuracy of Expected Error Estimation in a Hybrid Positioning System;" and U.S. patent application Ser. No. 12/479,729, filed Jun. 5, 2009 and entitled "Methods and Systems for Stationary User Detection in a Hybrid Positioning System."

BACKGROUND

1. Field

The disclosure generally relates to hybrid positioning systems and, more specifically, to methods of integrating wireless local area network (WLAN)-based positioning system (WLAN-PS) and satellite-based positioning system (SPS) to improve accuracy of location estimates, increase availability of the positioning service to more users, reduce power consumption, and also to improve estimation of the expected error in a user's position estimate.

2. Description of Related Art

In recent years the number of mobile computing devices has increased dramatically, creating the need for more advanced mobile and wireless services. Mobile email, walkie-talkie services, multi-player gaming, and call-following are examples of how new applications are emerging for mobile devices. In addition, users are beginning to demand/seek applications that not only utilize their current location but also share that location information with others. Parents wish to keep track of their children, supervisors need to track the locations of the company's delivery vehicles, and a business traveler looks to find the nearest pharmacy to pick up a prescription. All of these examples require an individual to know his own current location or the location of someone else. To date, we all rely on asking for directions, calling someone to ask their whereabouts or having workers check-in from time to time to report their positions.

Location-based services are an emerging area of mobile applications that leverage the ability of new devices to calculate their current geographic positions and report them to a user or to a service. Examples of these services range from obtaining local weather, traffic updates, and driving directions to child trackers, buddy finders, and urban concierge services. These new location-sensitive devices rely on a variety of technologies that all use the same general concept. By measuring radio signals originating from known reference points, these devices can mathematically calculate the user's position relative to these reference points. Each of these approaches has its strengths and weaknesses, depending upon the nature of the signals and measurements, and the positioning algorithms employed.

The Navstar Global Positioning System (GPS) operated by the US Government leverages about two-dozen orbiting satellites in medium-earth orbits as reference points. A user equipped with a GPS receiver can estimate his three-dimensional position (latitude, longitude, and altitude) anywhere at any time within several meters of the true location, as long as the receiver can see enough of the sky to have four or more satellites "in view." Cellular carriers have used signals originating from and received at cell towers to determine a user's or a mobile device's location. Assisted GPS (AGPS) is another model that combines both GPS and cellular tower techniques to estimate the locations of mobile users who may be indoors and must cope with attenuation of GPS signals on account of sky blockage. In this model, the cellular network attempts to help a GPS receiver improve its signal reception by transmitting information about the satellite positions, their clock offsets, a precise estimate of the current time, and a rough location of the user based on the location of cell towers. No distinction is made in what follows between GPS and AGPS.

All positioning systems using satellites as reference points are referred to herein as Satellite-based Positioning System (SPS). While GPS is the only operational SPS at this writing, other systems are under development or in planning. A Russian system called GLONASS and a European system called Galileo may become operational in the next few years. All such systems are referred to herein as SPS. GPS, GLONASS and Galileo are all based on the same basic idea of trilateration, i.e., estimating a position on the basis of measurements of ranges to the satellites whose positions are known. In each case, the satellites transmit the values of certain parameters which allow the receiver to compute the satellite position at a specific instant. The ranges to satellites from a receiver are measured in terms of the transit times of the signals. These range measurements can contain a common bias due to the lack of synchronization between the satellite and receiver (user device) clocks, and are referred to as pseudoranges. The lack of synchronization between the satellite clock and the receiver (user device) clock results in a difference between the receiver clock and the satellite clock, which is referred to as internal SPS receiver clock bias or receiver clock bias, here. In order to estimate a three dimensional position there is a need for four satellites to estimate receiver clock bias along with three dimensional measurements. Additional measurements from each satellite correspond to pseudorange rates in the form of Doppler frequency. References below to raw SPS measurements are intended generally to mean pseudoranges and Doppler frequency measurements. References to SPS data are intended generally to mean data broadcast by the satellites. References to an SPS equation are intended to mean a mathematical equation relating the measurements and data from a satellite to the position and velocity of an SPS receiver.

WLAN-based positioning is a technology which uses WLAN access points to determine the location of mobile users. Metro-wide WLAN-based positioning systems have been explored by a several research labs. The most important research efforts in this area have been conducted by the PlaceLab (www.placelab.com, a project sponsored by Microsoft and Intel); the University of California, San Diego ActiveCampus project (ActiveCampus—Sustaining Educational Communities through Mobile Technology, technical report #CS2002-0714); and the MIT campus-wide location system. There is only one commercial metropolitan WLAN-based positioning system in the market at the time of this writing, and it is referred to herein as the WPS (WiFi positioning system) product of Skyhook Wireless, Inc. (www.skyhookwireless.com).

FIG. 1 depicts a conventional WLAN-based positioning system based on WiFi signals. The positioning system includes positioning software 103 that resides on a mobile or user device 101. Throughout a particular target geographical area, there are a plurality of fixed wireless access points 102 that transmit information using control/common channel signals. The device 101 monitors these transmissions. Each access point contains a unique hardware identifier known as a MAC address. The client positioning software 103 receives transmissions from the 802.11 access points in its range and calculates the geographic location of the computing device using the characteristics of the radio signals. Those characteristics include the MAC addresses, the unique identifiers of the 802.11 access points, the Time of Arrival (TOA) of the signals, and the signal strength at the client device 101. The client software 103 compares the observed 802.11 access points with those in its reference database 104 of access points. This reference database 104 may or may not reside in the device 101. The reference database 104 contains the calculated geographic locations and power profiles of all access points the system has collected. A power profile may be generated from a collection of measurements of the signal power or signal TOA at various locations. Using these known locations or power profiles, the client software 103 calculates the position of the user device 101 relative to the known positions of the access points 102 and determines the device's 101 absolute geographic coordinates in the form of latitude and longitude or latitude, longitude, and altitude. These readings then can be fed to location-based applications such as friend finders, local search web sites, fleet management systems, and an E911 service.

In the discussion herein, raw WLAN measurements from an access point are generally intended to mean received signal strength (RSS) and/or times of arrival (TOAs) and/or time differences of arrival (TDOAs). References to data are generally intended to mean the MAC address, one or more record(s) of it, one or more power profile(s), and other attributes based on previous measurements of that access point. References to a WLAN-PS equation are intended to mean a mathematical equation relating the WLAN-PS measurements and data to the location of the mobile device.

A WLAN-based positioning systems can be used indoor or outdoor. The only requirement is presence of WLAN access points in the vicinity of the user. The WLAN-based position systems can be leveraged using existing off-the-shelf WLAN cards without any modification other than to employ logic to estimate position.

FIG. 2 illustrates a conventional way of integrating WLAN-PS and SPS, which consists of a WLAN-PS 201 and a SPS 206, and a location combining logic 210.

WLAN-PS 201 and SPS 206 are stand-alone systems and each can operate independently of the other system. Thus the result of each system can be calculated independent of the other system. The estimated location along with the expected error estimation of each system can be fed to the location combining logic 210. The expected error estimation is also referred to as HPE (horizontal positioning error) herein. The nominal rate of location update of SPS 206 and WLAN-PS 201 is once a second. The location combining logic 210 combines location estimates calculated in the same second by both systems.

WLAN-PS 201 is a conventional system which estimates the location of a mobile device by using WLAN access points. WLAN-PS 201 can include a scanner of WLAN APs 202, a device to select WLAN APs 203, a trilateration module 204, and HPE estimation device 205.

WLAN Scanner 202 detects WLAN APs surrounding the mobile device by detecting the received power (RSS, received signal strength) and/or time of arrival (TOA) of the signal. Different methods can be used to detect WLAN APs including active scanning, passive scanning, or combination of passive and active scanning.

The select WLAN APs device 203 selects the best set of WLAN APs to estimate location of the mobile device. For example, if ten WLAN APs are detected and one AP is located in Chicago and the others are located in Boston, without any other information, the Boston APs are selected. This is an indication that Chicago AP has been moved to Boston. In the conventional system the best set of WLAN APs is selected based on geographical distribution of WLAN APs in addition to corresponding parameters of WLAN APs, including received signal strength, signal to noise ration, and the probability of being moved.

Trilateration module 204 uses WLAN APs and corresponding measurements and characteristics to estimate location of the mobile device. Received signal strength or TOA measurements from WLAN AP are used to estimate distance of the mobile device to the WLAN AP. The aggregation of distance estimates from different WLAN APs with known location is used to calculate location of the mobile device. Trilateration 204 also can use a method which is called nearest neighbor, in which a location with a power profile similar or closest to the power reading of the mobile device is reported as the final location of the mobile device. The power profile of each WLAN AP or entire coverage area can be found in the calibration phase of the system by detailed survey of the coverage area.

HPE estimation device 205 is the module which estimates the expected error of the position estimate of the mobile device. The HPE, or Horizontal Positioning Error is calculated based on previously scanned APs and their characteristics and also characteristics of the received signal, as it was explained in co-pending Skyhook Wireless application Ser. No. 11/625,450 entitled "System and Method for Estimating Positioning Error Within a WLAN Based Positioning System," the entire disclosure of which is hereby incorporated by reference.

SPS system 206 consists of a satellite signal receiver and measurement device 207, trilateration device 208, and the SPS HPE estimation module 209.

The satellite signal receiver and measurement device 207 receives signals from the satellites in view of the device, decodes the received signal, and measures the satellite parameters from each satellite. The measurements can include pseudorange, carrier frequency, and Doppler frequency.

The trilateration device 208 uses measurements from at least four satellites and location of the satellites in view to estimate location of the user device, velocity, and direction of travel of the mobile device.

HPE estimation device 209 estimates the expected error of the estimated location. The HPE estimation device 209 is conventional and calculates expected error based on geometry of the satellites and signal quality of the received signal from satellites, for example, DOP (dilution of precision), and C/N (carrier to noise ratio).

Location combining logic 210 receives location and HPE estimates calculated for almost the same second from WLAN-PS 201 and SPS 206. In other words, measurements and estimations which are made at the same time are compared and combined. Practically, measurements and estimations within one second can be considered the same time. The location combining logic 210 of the user device reports one estimated location by selecting one of them or linearly combining them. For example, location combining logic might select one of the estimated locations provided by WLAN-PS 201 or SPS 206 based on reported expected error or HPE, or it might report weighted average of estimated locations by both systems according to the HPE.

SUMMARY

This disclosure describes a system and method for using a satellite positioning system to filter WLAN access points in a hybrid positioning system. In some embodiments, the method can include detecting WLAN APs in range of the WLAN and satellite enabled device, obtaining satellite measurements from at least two satellites to provide a plurality of possible satellite locations of the device, and providing a weight for each AP based on the distance from the WLAN APs to the possible satellite locations of the device.

In some embodiments, the method can include using the weight for each AP in a location algorithm to determine the location of the device.

In some embodiments, the possible satellite locations of the device can include a region of possible location solutions for the device.

In some embodiments a high weight can correspond to an AP that is close to the possible satellite locations of the device.

In some embodiments, close to the satellite estimate of the location of the device can include a distance within one order of magnitude of the coverage area of the AP.

In some embodiments, a low weight can correspond to an AP that is far from the satellite estimation of the location of the device.

In some embodiments, a WLAN AP can be far from the location of the device if the AP is located at a distance an order of magnitude above the coverage area of the AP.

In some embodiments, if the WLAN AP is determined to be far from the possible satellite locations of the device, the position of the WLAN and satellite enabled device can be calculated without data from the far WLAN AP.

In some embodiments, the weight can be based on the consistency between the location of the WLAN APs and the possible satellite locations of the device.

In some embodiments, the method can include eliminating WLAN APs which are not consistent with the possible satellite locations of the device.

In some embodiments, the WLAN AP location consistency with the satellite information can be measured by applying each of the WLAN AP locations to the satellite measurements and calculating the internal SPS receiver clock bias for each WLAN AP location.

In some embodiments, the method can include calculating an internal SPS receiver clock bias by considering the location of each WLAN AP as an initial position and the measurements from each satellite.

In some embodiments, the consistency of the internal SPS receiver clock bias for each of the WLAN AP locations can be used as an indication of distance between the WLAN AP location and the possible satellite device locations.

In some embodiments, the method can include calculating the consistency of the internal SPS receiver clock bias for each WLAN AP location can include calculating the standard deviation or the mean square error of the internal SPS receiver clock bias.

In some embodiments, the application describes a system for determining the location of a WLAN and satellite enabled device by using satellite measurements to weigh WLAN access points (APs), the system can include a hybrid positioning module which can include a WLAN module for receiving information from one or more WLAN access points, a satellite positioning module for providing a plurality of possible device locations of the device based on satellite information from at least two different satellites, and logic contained in the positioning module for providing a weight for each AP based on the distance from the WLAN APs to the possible satellite device locations of the device.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which.

DETAILED DESCRIPTION

Embodiments of the disclosed subject matter provide a method of integrating a WLAN-based positioning system (WLAN-PS) and a satellite-based positioning system (SPS) to create a hybrid positioning system. An integrated or hybrid system refers to a system which combines the measurements from one or more systems to improve the accuracy of the positioning and velocity and bearing estimates and the accuracy of expected error estimate, and to reduce consumed power as compared to each individual system working independently. The method of integrating a WLAN-PS and SPS to create a hybrid positioning system can add raw SPS measurements as another input to WLAN-PS and WLAN-PS final estimations as another input to SPS. Raw SPS measurements from two or more satellites can assist the WLAN-PS to increase the accuracy of position estimate, HPE, and stationary user detection. WLAN-PS initial position estimate and other estimations also can help SPS to reduce time to first fix (TTFF) and power consumption. A hybrid positioning system also can reduce power consumption compared to WLAN-PS and SPS working independently by deactivating WLAN-PS or SPS when they are not adding value in terms of increasing accuracy or other estimations.

Figure 3:
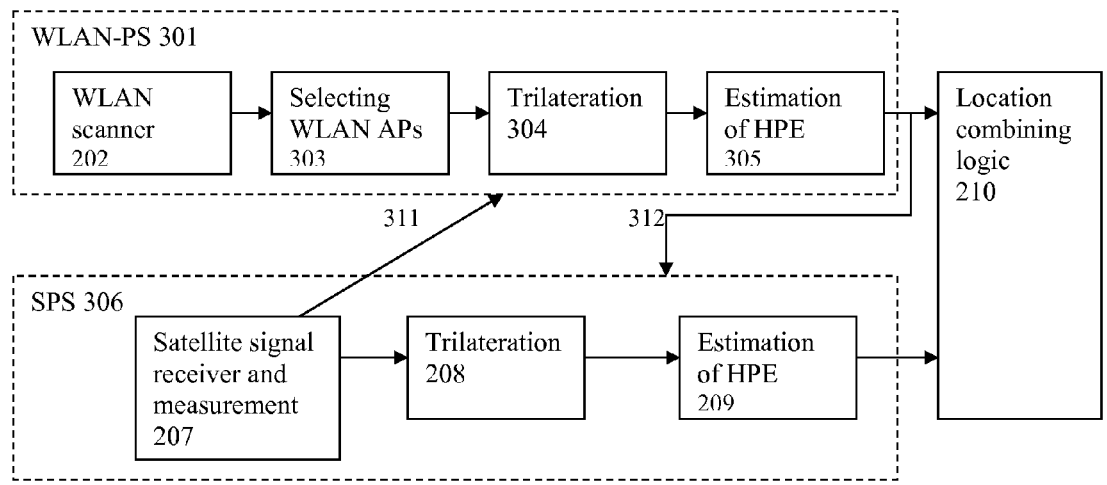
FIG. 3 illustrates a system for providing a WLAN-PS and SPS integrated solution according to some embodiments of the disclosed subject matter.

FIG. 3 illustrates a block diagram of the hybrid system of a WLAN-PS 301 and a SPS 306.

Figure 1:
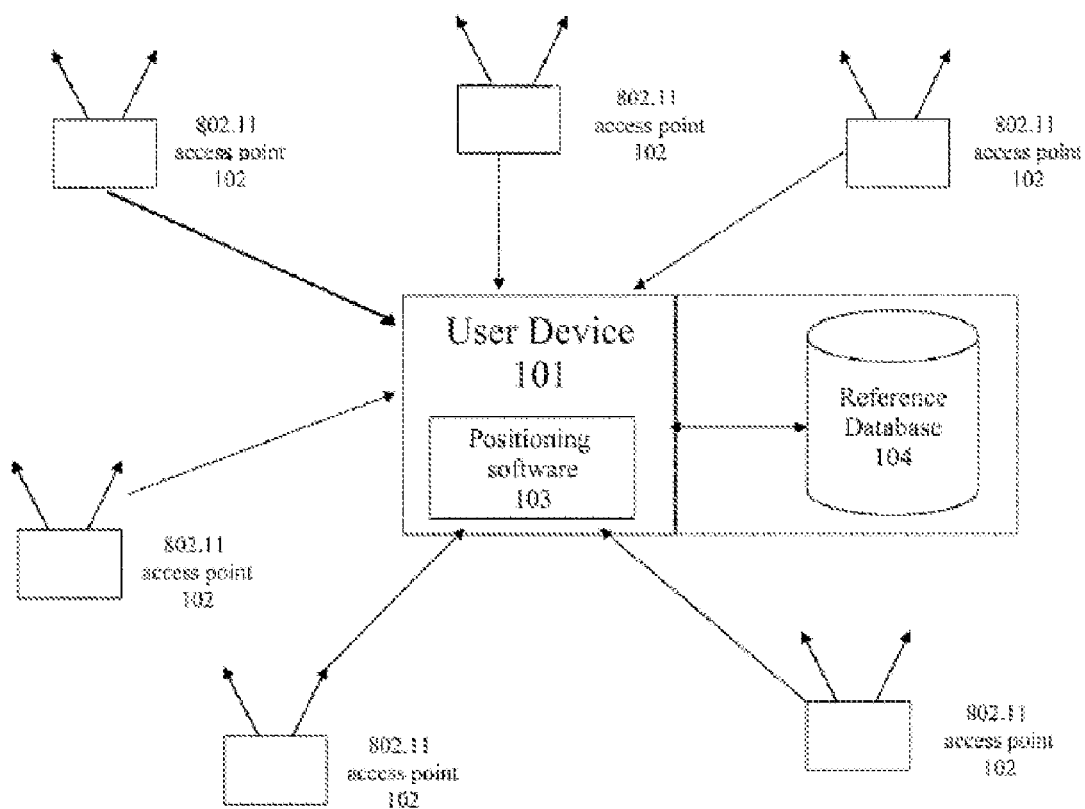
FIG. 1 illustrates a high-level architecture of a WLAN positing system.
Figure 2:
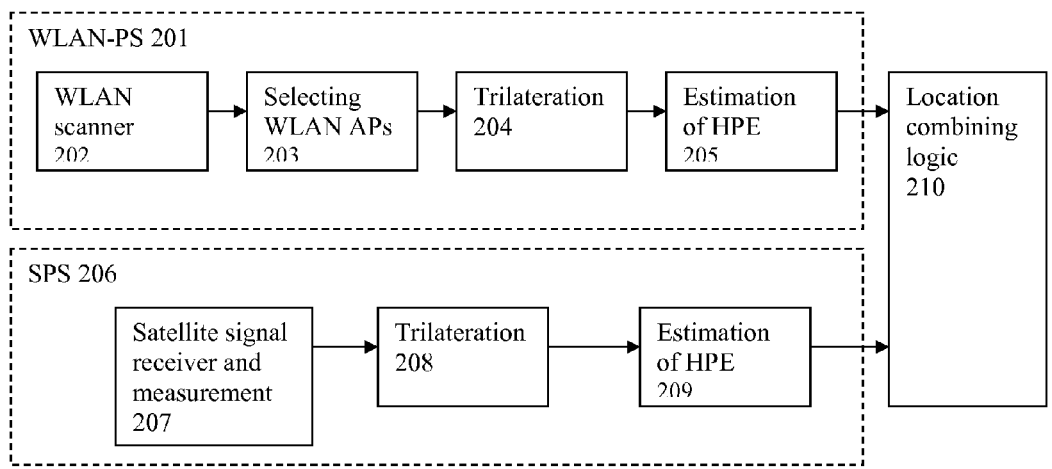
FIG. 2 illustrates a system for a conventional way of integrating WLAN-PS and SPS.

SPS 306 is an off-the-shelf, conventional satellite positioning device which consists of the same devices as SPS 206 in FIG. 2, with addition of an output 311 and an input 312 from the WLAN-PS (discussed in more detail herein). Satellite receiver and measurement device 207 is part of every conventional SPS receiver 306, and raw SPS measurements are an essential part of the SPS measurement. However, here the raw SPS measurements are used outside the SPS 306, as is shown by output 311. Not all the commercial SPS receivers expose the raw SPS measurements to devices outside SPS 306. For example, Star III GPS manufactured by SiRF Technology, Inc. (San Jose, Calif.) provides raw SPS measurements as part of its standard interface. However there are some other GPS receivers that do not provide such measurements. For the SPS receivers that do not expose raw SPS measurements as part of their standard interface, the SPS receiver 306 is modified to permit access to the raw SPS measurements.

The WLAN-PS 301 functions in a similar manner as the WLAN-PS 201 shown in FIG. 2 except that it is configured to receive raw SPS measurements 311. The integration of the raw SPS measurement with WLAN-PS 301 changes the design of WLAN APs selection device 303, trilateration device 304, and HPE estimation device 305. The WLAN-PS 301 can take advantage of the raw SPS measurements when at least two satellites are acquired, even without any fix or solution from the SPS 306.

This design change of WLAN-PS 301 after receiving raw SPS measurements is discussed in more detail herein.

Under one embodiment, the disclosed method integrates a WLAN-based positioning system (WLAN-PS) and a satellite-based positioning system (SPS) in which the WLAN-PS provides a set of possible locations of a mobile device, and among the possible locations, the one which fits the SPS measurements the best is selected as the final position estimate.

This embodiment also can provide a method to integrate WLAN-based positioning system (WLAN-PS) and satellite-based positioning system (SPS) in which the WLAN-PS provides a set of possible locations for the mobile device, and the possible locations are weighted according to their distance to a plurality of possible SPS device location solutions. In other words, weights are assigned to WLAN-PS possible solutions according how well they correspond to the satellite measurements. After assigning a weight to each possible location, various algorithms can be used to combine or select WLAN-PS possible locations. For example, the final reported location can be weighted by an average of all possible locations, low weight locations can be removed from the weighted average, or only the highest weighted location can be reported. Selection can be a special case of weighting, in which the respective weights are zero and one.

For example, because of the high density of WLAN APs in some areas, WLAN-PS can detect tens of WLAN APs in a given location. The detected WLAN APs may form more than one cluster. A cluster is defined as a set of APs in the coverage area of each other. If the coverage of a WLAN AP is not known, a nominal coverage can be considered. Nominal coverage or typical coverage of a WLAN AP is found statistically by measuring coverage for thousands of WLAN APs, and it is reported numbers between 100 m and 250 m at the time of writing this document. For example, if a mobile device detects fifteen WLAN APs, in which ten of them are located in a high-rise building and the other five are located in an office building far from the high-rise building (for example, 500 meters away from the high rise building), the detected WLAN APs can be considered as two clusters with a size of ten and five, respectively. Conventional positioning algorithms would select the cluster with a higher number of APs: the cluster of ten APs. Under the conventional approach, the location would be somewhere in the high-rise building. However, if raw SPS measurements from two or more satellites are considered with the cluster information, even with no location estimate from SPS, the raw SPS measurements can be used to select the appropriate cluster of WLAN APs from the plurality of clusters. In this example, the cluster of five WLAN APs might be selected as the closest cluster to the location of the mobile device, because it also satisfies the SPS equations. SPS measurements also can be used to assign a weight to the clusters of five and ten APs according to their estimated distance from possible SPS solutions. After assigning a weight to clusters, logic can be used to combine the estimation results of clusters and report only one location. For example, the weighted average of estimation results of clusters, estimations of the cluster with maximum weight, or average of estimation of clusters with higher weights can be reported as final estimation results.

The first step is detecting WLAN access points, which will be used as reference points to locate the user device. WLAN access points are randomly distributed, and they also might move over time. Therefore, the WLAN positioning system applies a clustering algorithm to identify all the clusters of WLAN access points that are detected by the end user.

A cluster of WLAN access points is a set of WLAN access points which are in the coverage area of each other. WLAN access points which are farther than a normal coverage of an access point from the cluster are considered as a new cluster.

For example, a user detects four access points and three of them are located in Boston and one of them in Seattle. Therefore, they form two clusters: one in Boston with three WLAN access points and one in Seattle with one WLAN access point. Each cluster of WLAN access point can result to a separate location in a WLAN positioning system. If the mobile device also acquires signals from two or more satellites, the satellite measurements can be used to select the cluster of WLAN access points or reject clusters of WLAN access points. Two or more satellite measurements provide a set of solutions in a form of a region (volume, surface or a curve). The proximity of possible WPS solutions to SPS possible solutions can be criteria to weight, select, or reject WPS solutions. In other words, the closer the WLAN-PS solution to the SPS solutions, the higher the quality of the WLAN-PS solution.

Figure 4:
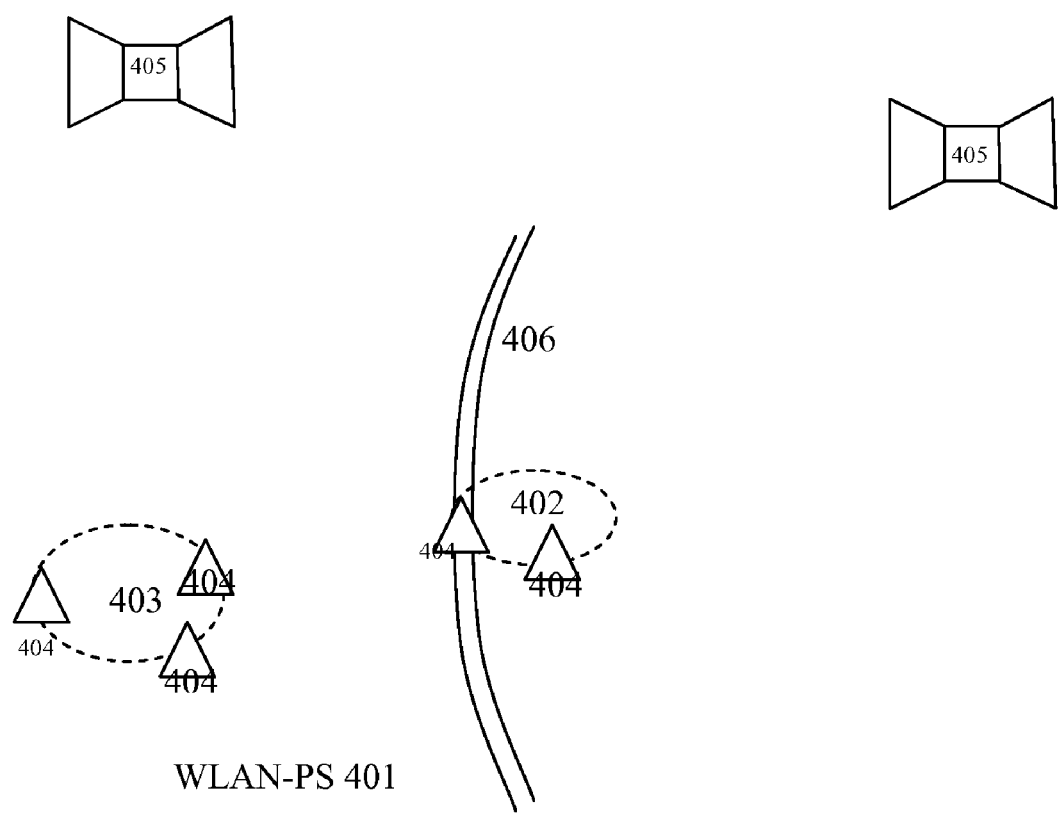
FIG. 4 illustrates an example of selecting a solution between possible WLAN-PS solutions using raw SPS measurements from two satellites according to some embodiments of the disclosed subject matter.

For example, FIG. 4 shows a WLAN-PS 401, which consists of five WLAN access points 404. The WLAN access points form two clusters in this example, a first cluster 402 and a second cluster 403. Each cluster can be used to estimate the location of the user device. If the user device acquires a signal from at least two satellites 405, the possible solutions of the two or more satellites 406 can be used to select or eliminate some clusters. In this example, possible solution of the two or more satellites is shown as a band 406. Cluster 402 is closer to the possible satellite solutions band 406 than cluster 403. Therefore, cluster 402 can be selected and cluster 403 can be rejected.

Figure 5:
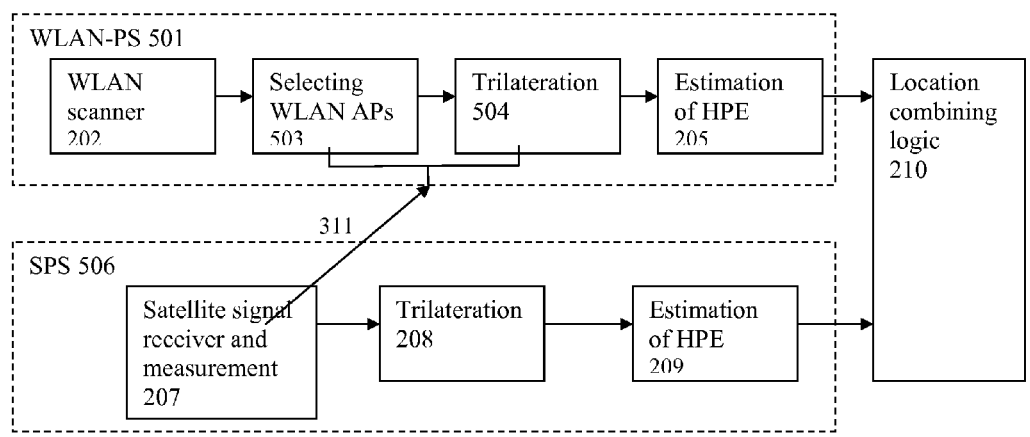
FIG. 5 illustrates a system for integrating WLAN-PS and SPS in which raw SPS measurements are provided to WLAN-PS to select the best solution according to some embodiments of the disclosed subject matter.

FIG. 5 illustrates block diagram of integrated solution of SPS and WLAN-PS. SPS 506 can be a standard, off-the-shelf device, but it has to be able to provide raw SPS measurements as discussed in FIG. 3. The raw SPS measurements 311 are directed to WLAN APs 503 and trilateration device 504.

The WLAN APs selection devices 503 receives the data from WLAN scanner 202 as an input. The WLAN APs selection device 503 clusters WLAN APs based on the distance between the access points. The WLAN APs selection device 503 not only identifies clusters, but also selects a different set of WLAN APs for each cluster. Each different cluster may result in a different location estimate. All of the different sets of clusters can be used in the trilateration device 504 and may result in a different location estimate. The location estimates based on clusters can be weighted according to the cluster distance from the SPS possible solutions or can be selected according to their cluster distance from SPS possible solutions. A cluster can be assigned a high weight if it is considered close (at a small distance) from the satellite distance solution. For example, if the cluster is located on the order of 10 meters away from the satellite distance solution. A cluster can be assigned a low weight if it is considered far (at a large distance) from the satellite distance solution, for example, if it is located on the order of 100 or 1,000 meters away from the satellite distance solution.

The SPS solutions can be found as follows. In each satellite measurement, there are generally four unknowns coordinates of location of the mobile device, (x,y,z) and internal clock bias of SPS receiver. The raw SPS measurements from two or more satellites can be used to eliminate the internal clock bias of the SPS receiver from the equations. In this case, the result is going to be a function of coordinates of the location of the user device, (x,y,z), which can be written as a general form as follows:

$$F(x,y,z)=0.$$

This function can represent an area, a surface, or a curve based on number of satellites. Therefore, raw SPS measurements from two or more satellites can result in a set of possible solutions, even without having a final location estimate.

The distance between the different solutions of WLAN-PS and possible solutions of SPS can be used as criteria to weigh each WLAN-PS solution. After assigning a weight to each WLAN-PS possible solution, logic can be used to combine the solution or select the solution from the possible solutions.

Further, the consistency between the SPS measurements and the locations provided by the WLAN-PS can be used as an indication of distance between the locations provided by the WLAN-PS and location of the mobile device. The location of the user device can be calculated by (1) using the possible WLAN-PS locations as rough estimates of the location of the user device (i.e., using each possible WLAN-PS location as the x,y,z) and (2) calculating the final unknown, internal satellite receiver clock bias, for each WLAN-PS location estimate using the measurements from each satellite. The consistency between the calculated internal satellite receiver clock biases (calculated for each satellite in view) for each WLAN location estimate can be used as an indicator of distance between WLAN-PS's location estimate and the mobile device actual location. Good WLAN-PS estimates will have consistent receiver clock bias estimates, i.e., when that WLAN-PS estimated location is used as the x,y,z location, for each satellite, the receiver clock bias will be substantially the same, for example, within about 10% of each other. However, if the WLAN-PS location is a poor estimate of the location of the user device, the WLAN-PS location will produce varied satellite receiver clock bias estimates for each satellite, for example, the receiver clock biases will vary by at more than 10%.

If clock bias which is found for each satellite measurement is denoted by Ci, the consistency of Ci can be used as a measure of distance between a given position (in this case, locations determined by the WLAN-PS) and the locations that satisfy the satellite equations. The consistency of Ci can be measured with different mathematical approaches, like standard deviation of Ci, or mean square error of Ci estimation as follows:

$$\overline{C} = \frac{\sum_{i=1}^{N} C_i}{N}$$

$$MSE = \frac{\sum_{i=1}^{N} (C_i - \overline{C})^2}{N}$$

The value of MSE can be used as an indicator of the consistency of the Ci samples. Therefore, all possible locations of WLAN-PS can be examined with SPS raw measurements, and the consistency of Ci can be used as an indicator of the solution's distance to the actual mobile device location. This distance can be used with other WLAN AP parameters to weight or select or deselect (remove) an AP in the process of calculating the mobile device location.

Figure 6:
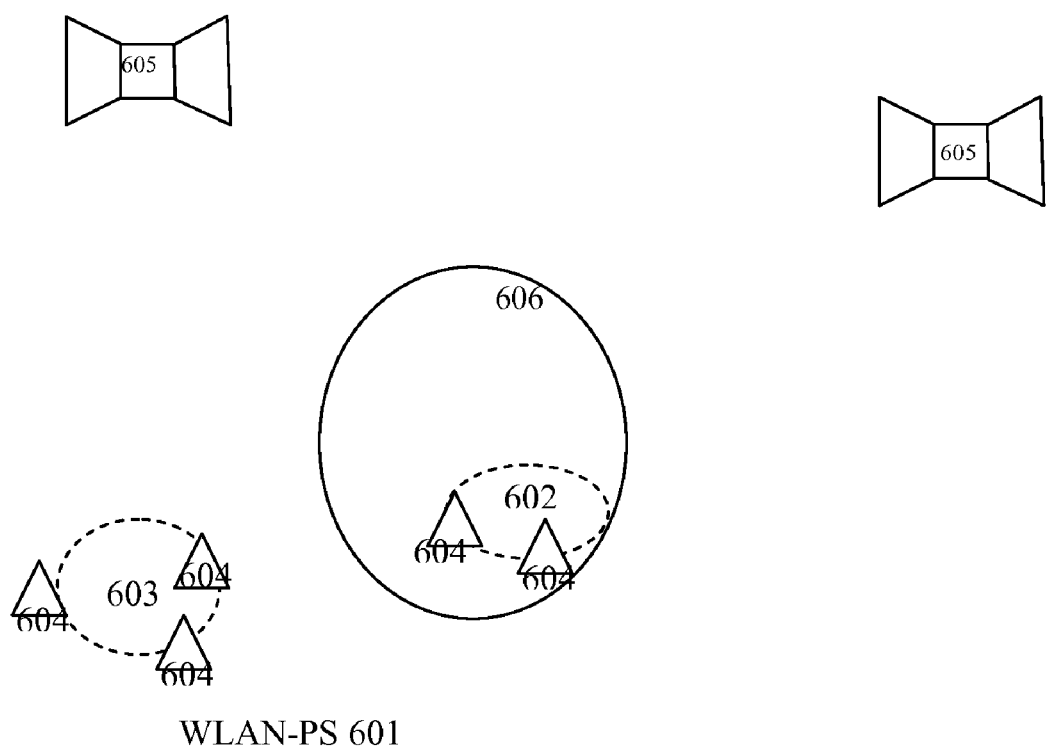
FIG. 6 illustrates an example of selecting a solution between possible WLAN-PS solutions based on SPS possible solutions according to some embodiments of the disclosed subject matter.

FIG. 6 shows SPS solution in form of a region 606 and a WLAN positioning system 601, in which WLAN access points 604 form a first cluster 602 and a second cluster 603. The mobile device acquisition of two or more satellites 605 also can result in a set of possible satellite device solutions 606. The consistency between the SPS solutions 606 and WLAN-PS solutions 602 is used to select the best solution, which is the 602 solution of WLAN-PS in this example. The consistency between the SPS and WLAN-PS means both of them report the same location as part of their solutions or that the final estimated position is one of the solutions of both systems. Further, a cluster of APs can be weighted according to their distance to possible solutions of SPS.

Another embodiment of the disclosed subject matter provides a method to weigh WLAN access points by using raw SPS measurements. Selecting the best set of WLAN access points to estimate end user's location by using raw SPS measurements can be a specific case of assigning a weight to WLAN APs. In addition to other criteria used to weight or select the best set of WLAN access points to estimate the mobile device location, raw SPS measurements can be used or combined with the other criteria. Other criteria and weights are weight based on received signal strength or weight based on round trip time of received signal. The WLAN-PS uses WLAN APs and their characteristics to estimate the location of a mobile device.

The characteristics of a WLAN AP might include, but are not limited to, received signal strength (RSS), location or estimation of location, signal to noise ratio, and time of arrival (TOA). Raw SPS measurements from two or more satellites are used to calculate an indication of distance between location (or estimated location) of WLAN APs and actual location of the mobile device. This indication of distance can be used to select the best set of WLAN APs to estimate location of the mobile device, or the indicator of distance can be used to weight WLAN APs according to their distance from the device location. The raw SPS measurements from at least two satellites can be used in this process, with or without having a location estimate from SPS. The distance is considered far if the distance is more than an order of magnitude larger than the coverage area of the WLAN AP. A distance is considered close or not far is the distance is within an order of magnitude of the coverage area of the WLAN AP. WLAN APs that are considered far can be eliminated from the positioning calculation.

Figure 7:
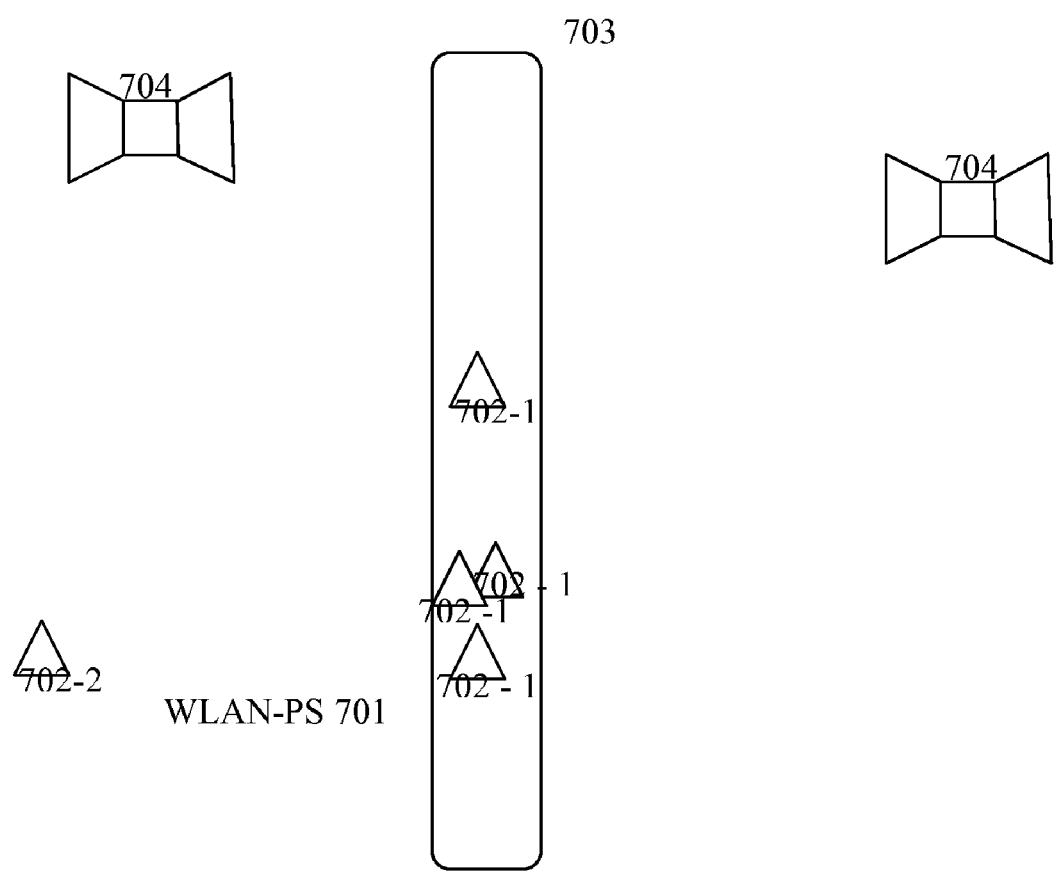
FIG. 7 illustrates an example of selecting the best set of WLAN APs based on raw SPS measurements according to some embodiments of the disclosed subject matter.

FIG. 7 shows an example of an integrated solution of WLAN-PS and SPS, in which the mobile device detects five WLAN access points 702 and has acquired a signal and raw measurements from two satellites 704. In this example, the WLAN access points are randomly spread around the mobile device, and distance between WLAN access points 702 and possible solutions of two satellites 703 can be used as an indication of distance between WLAN access point and actual location of the mobile device. A region of possible SPS solutions 703 is calculated using measurements from two satellites. The distance between the WLAN access point 702 and SPS possible solution 703 is used as an indicator of distance between WLAN access point and actual location of the mobile device. In this example, all the WLAN access points 702-1 are very close to SPS possible solutions 703, but one WLAN access point 702-2 is not. Therefore, the longer distance between WLAN access point 702-2 and possible SPS solutions 703 is an indicator of a larger distance between WLAN access point 702-2 and the location of the mobile device compared to other detected WLAN access points 702-1. Thus, WLAN access point 702-2 can be weighted according to its distance to SPS possible solutions, or it can be removed from the set of APs to calculate the mobile device location.

Figure 8:
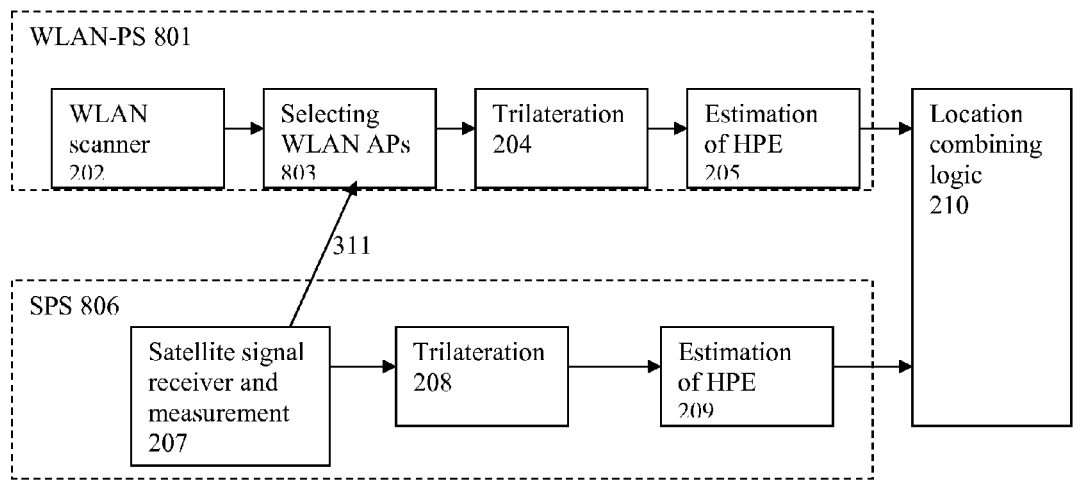
FIG. 8 illustrates a system for integrating WLAN-PS and SPS and using raw SPS measurements from two or more satellites to select a set of WLAN APs in WLAN-PS according to some embodiments of the disclosed subject matter.

FIG. 8 illustrates WLAN-PS 801 and SPS 806 integrated solution, in which all the modules are the same as FIG. 2, except for selecting WLAN APs 803. Selecting WLAN APs 803 also receives raw SPS measurements 311 as an input. These raw measurements are used to estimate the distance between the location (or estimated location) of WLAN APs and the location of the mobile device.

As discussed in the previous embodiment, in this embodiment there is a need to calculate an indication of the distance between WLAN APs location (or estimated location) and actual location of the mobile device using SPS measurements from two or more satellites. The consistency between the raw SPS measurements and the WLAN APs can be used as an indication of distance between the location of WLAN APs and the location of the mobile device. The consistency can be calculated by (1) using the WLAN AP's location as an estimation of the location of the mobile device and (2) calculating the receiver clock bias for each WLAN AP location based on the measurements from each satellite. The consistency between calculated receiver clock biases can be used as an indicator of distance between WLAN APs location and the mobile device's actual location.

In other words, after applying the location of a WLAN AP as an initial position in SPS equations using pseudorange measurements, the only remaining unknown is the receiver clock bias, which is the same for all SPS raw measurements. If clock bias which is found for each satellite measurement is denoted by Ci, the consistency of Ci is used as a measure of distance between the given position (in this case, location of WLAN AP) and the location that satisfies the satellite equations. Consistency of Ci can be measured with different mathematical approaches, like standard deviation of Ci, or mean square error of Ci estimation as follows:

$$\overline{C} = \frac{\sum_{i=1}^{N} C_i}{N}$$

$$MSE = \frac{\sum_{i=1}^{N} (C_i - \overline{C})^2}{N}$$

The value of MSE can be used as an indicator of the consistency of the Ci samples. Therefore, the location of all the detected WLAN APs can be examined with SPS raw measurements, and the consistency of Ci can be used as an indicator of their distance to the mobile device location. This indicator can be used with other AP parameters to weight, select, or remove an AP in the process of calculating the mobile device location.

Under another embodiment of the disclosed subject matter, a system and method is provided in which the WLAN-PS provides a region in which a possible location solution resides, and within the provided region, the final location estimate of the mobile device is selected based on SPS measurements from two or more satellites.

Figure 9:
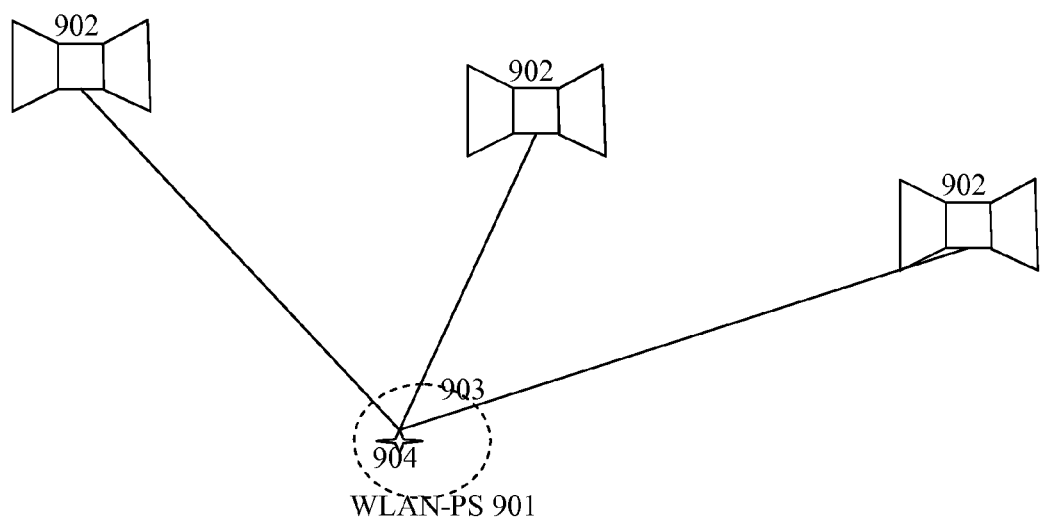
FIG. 9 illustrates a system for examining the location estimate and uncertainty provided by WLAN-PS against SPS in order to find the best estimate of the location of a mobile device according to some embodiments of the disclosed subject matter.

FIG. 9 shows an integrated WLAN-PS and SPS, in which WLAN-PS 901 provides an estimate of the location of the mobile device with some uncertainty 903. The uncertainty 903 can be the expected error of WLAN-PS. The mobile device also acquires signal from two or more satellites 902. Using all the points within the uncertainty area 903 reported by WLAN-PS, the location 904 which fits the satellite measurements the best is selected as the best estimate of location of the mobile device.

Figure 10:
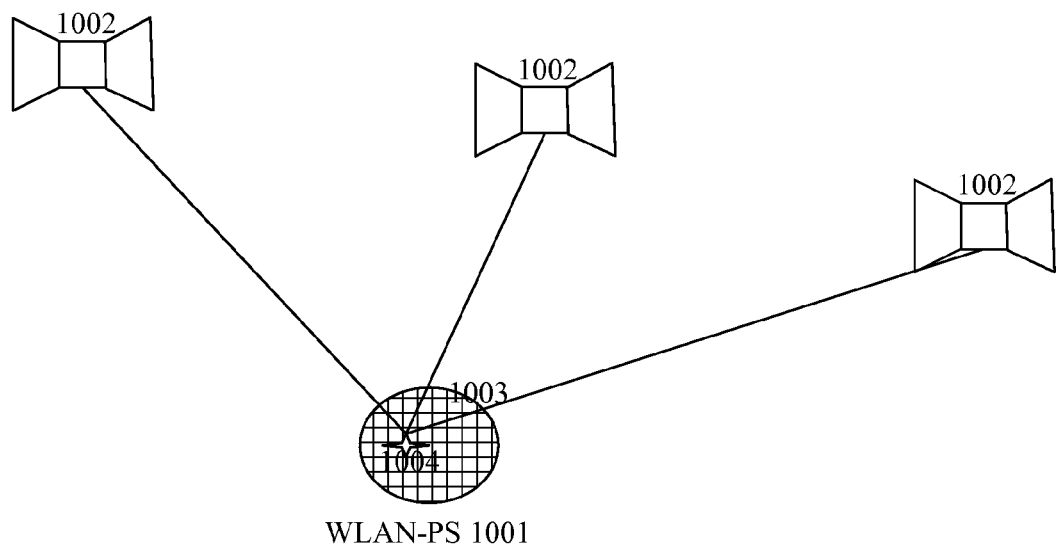
FIG. 10 illustrates a system for examining the location estimate and uncertainty provided by WLAN-PS against SPS in order to find the best estimate of the location of a mobile device by using the grid method according to some embodiments of the disclosed subject matter.

The best point which fits satellite solutions within that region can be found by dividing the uncertainty area 903 to small grids and evaluating each grid point as is shown in FIG. 10. The distance between grid lines can be based on the required accuracy of location estimation and the quality of the SPS measurements. The higher the accuracy requirement and the quality of the SPS measurements, the smaller the distance between the grid lines can be and the more accurate the location estimate. For example, the grid lines can be between about 5 meters and about 100 meters apart, preferably at about 10 meters apart.

In this embodiment, the number of SPS satellites 902 can be two or more. This system or method can be used in cases where the SPS cannot determine the location of the mobile device by itself but where the WLAN-PS possible solution 903 can be examined with the SPS information to select as the best location 904 the one that is most consistent with the SPS pseudorange equations.

Figure 11:
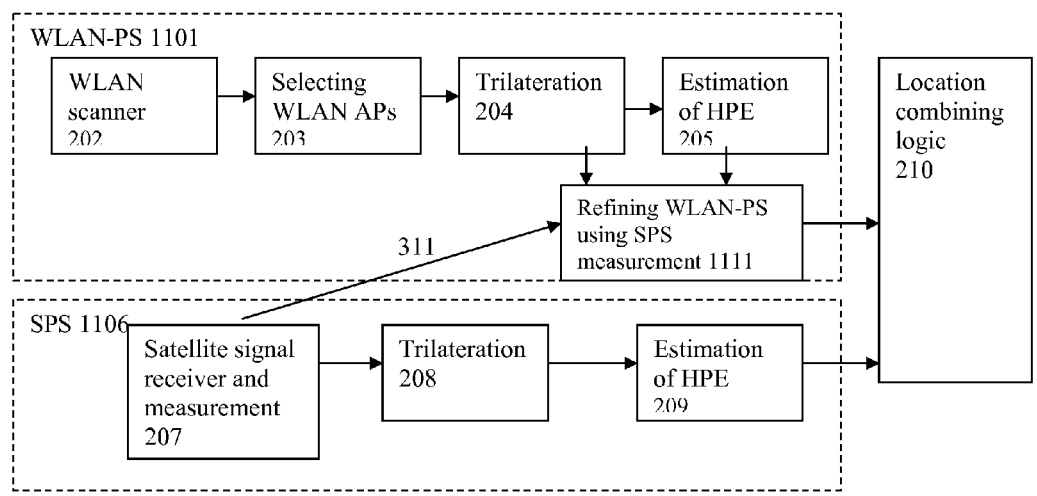
FIG. 11 illustrates a system for integrating WLAN-PS and SPS, in which raw SPS measurements are used to refine WLAN-PS location estimate according to some embodiments of the disclosed subject matter.

FIG. 11 shows an integrated solution of WLAN-PS 1101 and SPS 1106, in which final location estimate provided by WLAN-PS is refined by using SPS measurements 311 from two or more satellites. A new module, refining module 1111, is added to conventional WLAN-PS, which receives WLAN-PS trilateration results, the corresponding uncertainty of those measurements, and SPS measurements from two or more satellites. Using this information, the refining module 1111 reports the location estimate of the mobile device.

For example, if the WLAN-PS provides a sphere of possible location solutions to refining module 1111. The size of the sphere corresponds to the uncertainty of the location estimate of WLAN-PS (expected error), which can be calculated for each position estimate in some embodiments, or the nominal value of uncertainty of WLAN-PS can be used. For example, median error of Skyhook Wireless WLAN-PS is about 30 m, which can be used as nominal value of WLAN-PS error. In the next step, SPS measurements from two or more satellites can be used to find a point within the specified region by WLAN-PS, which satisfies the SPS measurements the best. The satellite equation for each satellite is written as follows:

$$Fi(x,y,z,b)=0$$

In which (x, y, z) is location of the mobile device, and b is denoted for the internal clock bias of SPS receiver. Any point within the specified region by WLAN-PS provides an estimate for the location of the mobile device, (x, y, z), and internal clock bias is calculated for each acquired satellite. Because all the measurements are done at almost the same time by the same SPS receiver, the internal clock bias of SPS receiver should be almost the same for all the SPS measurements. Therefore, as discussed previously, the consistency between receiver clock biases of SPS receiver calculated from different acquired satellites can show the distance between location estimate (x,y,z) and actual location of the mobile device. The consistency of the calculated internal clock of SPS receiver can be measured by calculating the standard deviation of the receiver clock bias measurements.

In the case where the specified region by WLAN-PS is divided into a grid, the SPS equations are examined at each grid point. The grid point which provides the most consistent receiver clock bias for all the acquired satellites is the best location estimate of the mobile device.

Another embodiment of the invention provides a method to reduce acquisition time of SPS by providing a position estimate of WLAN-PS as an initial position to SPS. Providing an initial position by WLAN-PS can reduce the acquisition period of the SPS and therefore reduces time to first fix of SPS. Satellite positioning systems already provide a method to receive an initial position, and how they use the provided initial position inside SPS is generally known. The present system uses a WLAN-PS location estimate as a source of initial position for the satellite positioning system. Because the location of SPS satellites are known at any time, knowledge of a rough location of the mobile device can help the SPS to reduce the set of satellites it searches for to the set of satellites actually visible to the device, instead of all of the satellites, thereby reducing searching time.

Figure 12:
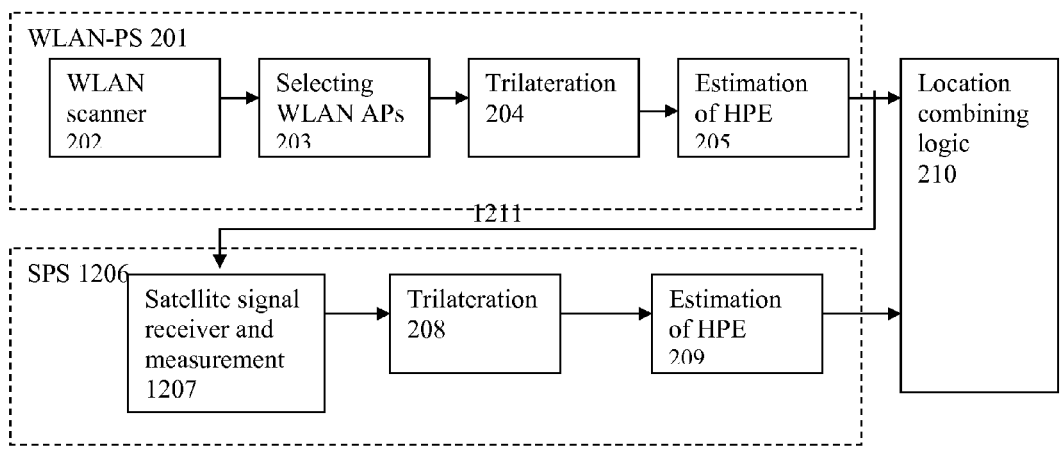
FIG. 12 illustrates a system for integrating WLAN-PS and SPS, in which as WLAN-PS location estimate is provided as initial location estimate according to some embodiments of the disclosed subject matter.

FIG. 12 illustrates a WLAN-PS 201 and SPS 1203, in which WLAN-PS provides an initial position 1211 to the SPS system. Thus, the estimated location of the mobile device 1211 by the WLAN-PS 201 can be provided as initial position to SPS 1202. Knowing the initial position of the mobile device can assist SPS 1202 to select the best set of the satellites to search and reduce time to fix a location of the device.

The WLAN-PS and the SPS can work independently and provide estimates of attributes of a mobile device, including location estimation, expected error in the location estimation, velocity, and bearing estimation. However, because WLAN-PS has a much shorter time to first fix (TTFF) than SPS, the estimated location by WLAN-PS can be provided to SPS as initial position of the mobile device, reducing the time required to find location.

The receipt of an initial position is a standard practice in SPS, and most of the SPS receivers provide a method to receive the initial position. Here the WLAN-PS is used as the source of providing the initial position to SPS.

Another embodiment of the invention provides a method to increase the accuracy of the expected error of location estimate of the integrated location solution of SPS and WLAN-PS and compare the error to the error location result for each individual system. The expected error estimation provides an uncertainty area around the estimated location. If estimated location of WLAN-PS and SPS are within the uncertainty area of each other, the uncertainty area is reduced based on distance between estimated locations from both systems. If estimated locations of WLAN-PS and SPS are not within the uncertainty area of each other, the uncertainty area is increased based on distance between estimated locations from both systems. If only one of the estimated locations of WLAN-PS and SPS falls inside the uncertainty area of the other system, the uncertainty area can be reduced or increased based on quality of estimated error from each system. The estimated error of location estimate normally reports the 95% confidence interval, but it can report any other confidence interval as well.

Another embodiment of the invention provides a method to increase the accuracy of the expected error of a location estimate of the integrated location solution of SPS and WLAN-PS. The WLAN-PS provides a location estimate and the SPS acquires at least two satellites. The expected error estimation provides an uncertainty area around the estimated WLAN-PS location. The consistency between the estimated location of WLAN-PS and raw SPS measurements is used as criteria to reduce or increase the expected error estimate. If estimated location estimate of WLAN-PS and raw SPS measurements are consistent, the uncertainty area is reduced based on distance between WLAN-PS estimated location from SPS possible solutions. If the estimated location of WLAN-PS and raw SPS measurements are not consistent, the uncertainty area is increased based on distance between WLAN-PS estimated locations from SPS possible solutions.

Figure 13:
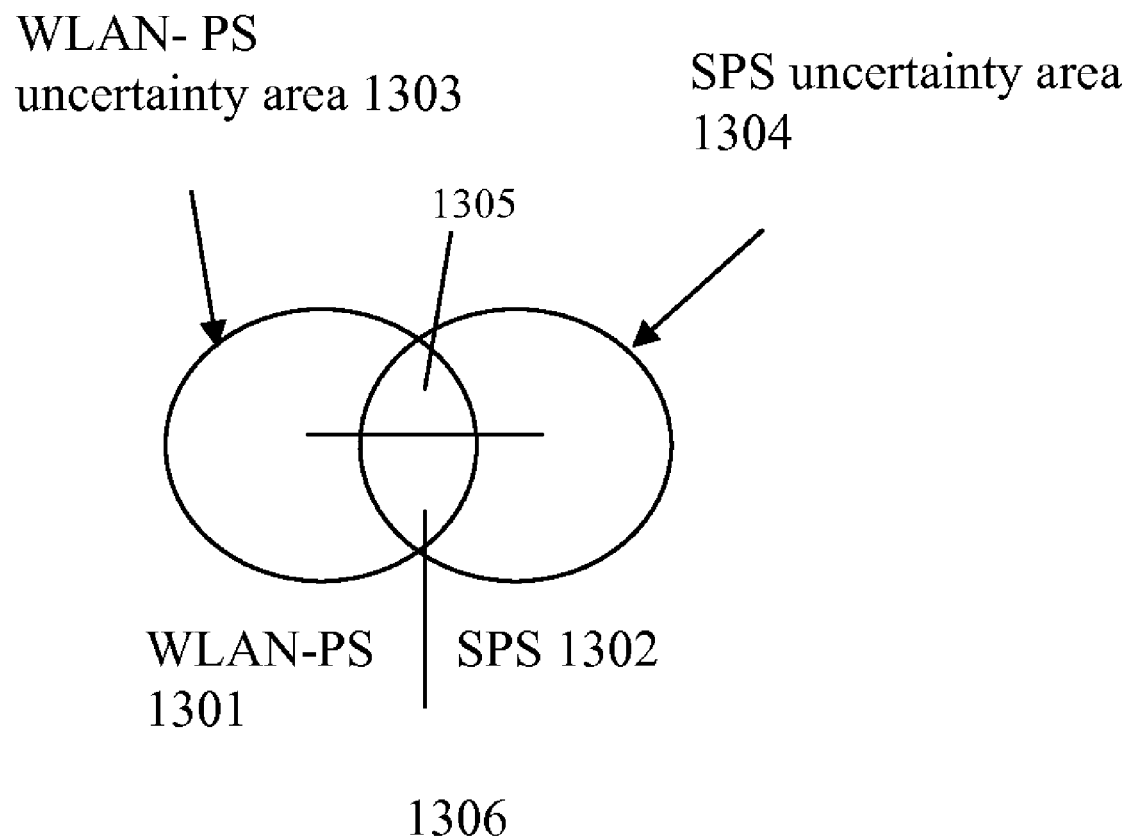
FIG. 13 illustrates an example for increasing accuracy of the estimation of expected error by using SPS and WLAN-PS information according to some embodiments of the disclosed subject matter.

FIG. 13 illustrates WLAN-PS location estimation 1301 and WLAN-PS expected error of estimation 1303 and also SPS location estimation 1302 and SPS expected error of estimation 1304. The reported uncertainty by each system is the expected error of position estimate.

In such a system, the SPS and WLAN-PS each provides a location estimate and also an estimate of the expected error in that location estimation. The expected errors of the location estimate provided by both systems are combined in order to provide a better estimate of the error of the location estimation. For example, if each system provides an area around the reported location as an uncertainty of the estimated location (1303 and 1304), the integrated system considers the overlap of the uncertainty areas 1305 and also the distance between estimated locations 1306 to estimate the uncertainty of the final location estimate. The greater the distance between the estimated locations by SPS and WLAN-PS is, the higher the expected error of location estimation. In another implementation, the system can select the location estimate with the lowest uncertainty as the final location estimate.

Figure 14:
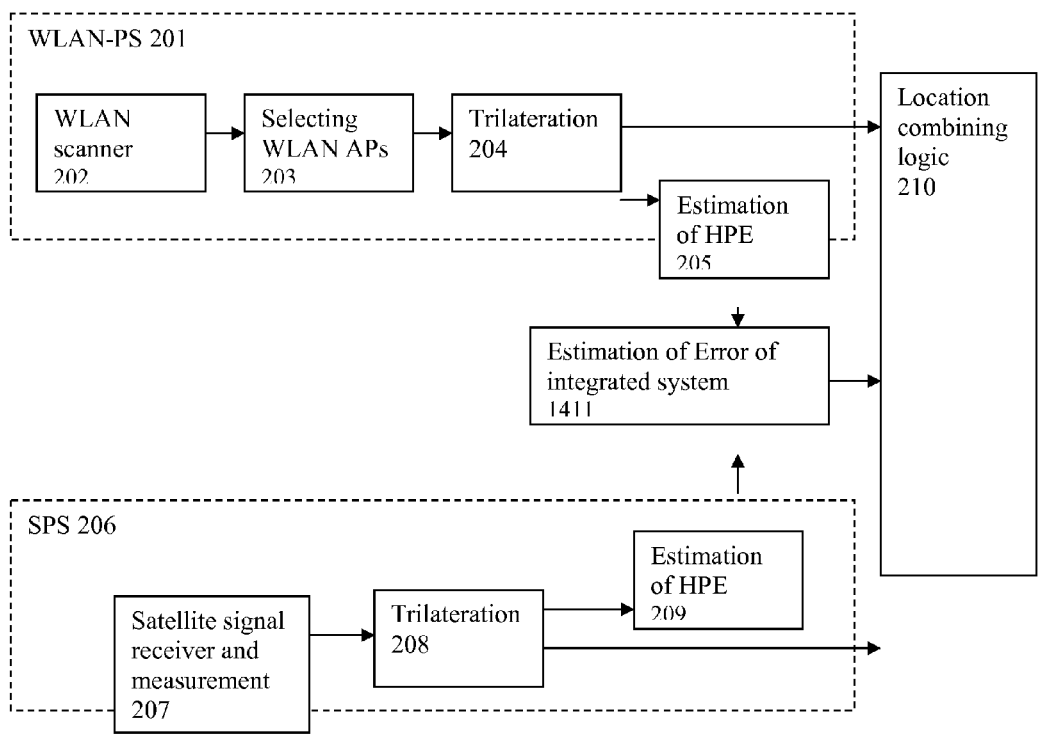
FIG. 14 illustrates a system for increasing accuracy of the estimation of expected error by using SPS and WLAN-PS information according to some embodiments of the disclosed subject matter.

FIG. 14 illustrates a block diagram of integrated WLAN-PS and SPS system, in which the expected error of each system is calculated using conventional method and the results are provided to integrated error estimation system device 1411. The integrated error estimation 1411 calculates the final expected error by considering the consistency between the reported locations by WLAN-PS and SPS. The consistency can also be determined by comparing the receiver clock bias, as discussed previously.

In some embodiments, the SPS can detect that the mobile device is stationary. In general, it takes measurements from four SPS satellites to estimate the velocity or speed of a mobile device. The present method and system can determine if the mobile device is stationary by using the measurements from as few as two satellites by examining the consistency of the Doppler frequency measurements from the two or more satellites. If the device is stationary, the Doppler measurements from SPS must be fully accounted for by satellite motion relative to initial position of the device and the frequency offset of the receiver clock. The receiver clock offset can be estimated, given the Doppler measurements from two or more satellites. The hypothesis that the user is stationary is based on the size of the residuals after the estimated receiver frequency bias is substituted in the SPS Doppler equations.

By knowing that a mobile device is stationary, the hybrid system can cause the WLAN-PS to respond differently than when the device is in motion. For example, WLAN-PS can save power by updating the location less often, for example, once a minute. In addition, the WLAN-PS can consider all of the detected WLAN access points over the time interval that the mobile device is stationary and use the collective information to estimate an improved location of the mobile device. This is because the WLAN-PS can obtain a better estimate of the received signal strength from an access point and better mitigate power fluctuation due to multi-path when user is stationary. Multipath is the propagation phenomenon that results in radio signals reaching the receiving antenna by two or more paths and causes power to fluctuate, and it is a known phenomena by experts in the radio propagation field.

Figure 15:
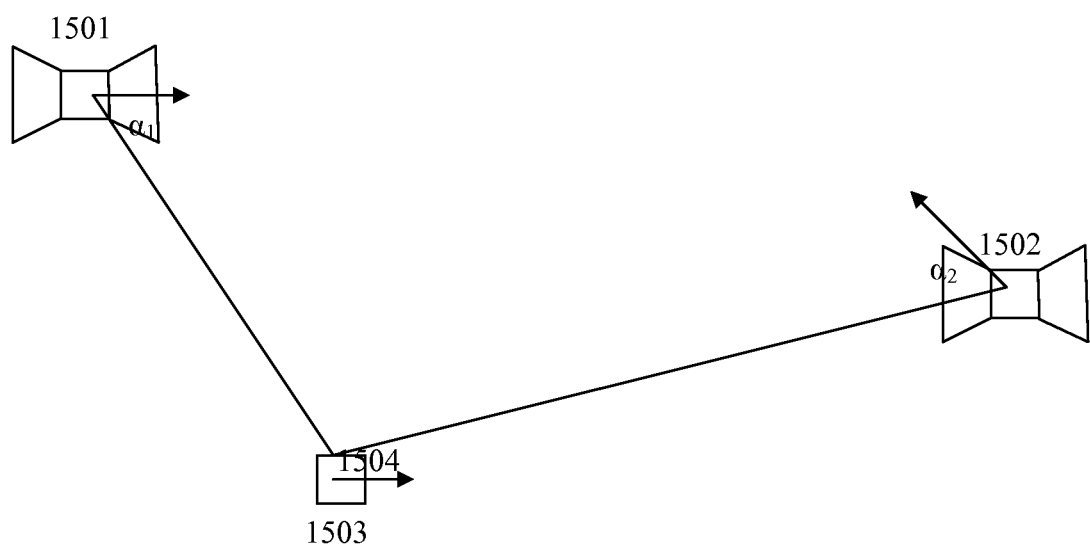
FIG. 15 illustrates a system for stationary user detection based on two or more satellites according to some embodiments of the disclosed subject matter.

FIG. 15 illustrates stationary user detection based on two or more satellites.

If the mobile device 1503 detects two or more satellites, 1501, 1502 one can determine that the mobile device is stationary or moving from Doppler measurement of the received signal from satellites.

The first step is finding a rough location of the mobile device 1503, which can be calculated by WLAN-PS. This rough estimate of location of the mobile device can be provided by other positioning technologies as well. The rough estimation of the location of the mobile device can have an error of up to about a couple of kilometers although accuracy of rough estimation of location by WLAN-PS is maximum couple of hundred meters.

The mobile device can acquire a signal from at least two satellites, which are shown with satellites 1501 and 1502 in FIG. 15. The mobile device also knows the velocity of the satellites at the exact time of signal acquisition. In other words, if the mobile device 1503 acquires a signal from satellites 1501 and 1502 at time t, the velocity of the satellites at time t also is known by the mobile device. The mobile device 1503 can determine the velocity of the acquired satellites 1501 and 1502 by decoding the messages received from the satellites, as all satellite broadcasts its velocity at any moment of time. The mobile device can also receive satellite velocity from other sources, for example, a cellular network.

Velocity is a vector with magnitude and direction, and it was shown with velocity of $V_1$ and $V_2$ for satellites 1501 and 1502, respectively. Doppler frequency due to satellite movement is calculated based on velocity. The simplified equation to find Doppler frequency for each satellite is as follows:

$$f_{d1} = \frac{v_1}{\lambda} \quad (1)$$
$$f_{d2} = \frac{v_2}{\lambda}$$

The $\lambda$ is wavelength of SPS radio wave and it is known for any SPS system, and $f_d$ is the Doppler frequency.

The mobile device measures the frequency of the received signal from each satellite. Since the transmit frequency of each satellite is known, the mobile device can measure the difference between the frequency of the received signal and the transmitted signal. The difference between received and transmitted frequency are denoted by $f_0$ and $f_{12}$ for satellites 1501 and 1502, respectively.

If the mobile device frequency offset of the internal clock is $f_0$ and the velocity of the mobile device 1503 is $v_m$, the measured frequency from each satellite is calculated as follows:

$$f_{d1}\cos(\alpha_1) + f_o + \frac{v_m}{\lambda}\cos(\beta_1) = f_{m1} \quad (2)$$
$$f_{d2}\cos(\alpha_2) + f_o + \frac{v_m}{\lambda}\cos(\beta_2) = f_{m2}$$

The angles $\alpha_1$ and $\alpha_2$ are between the velocity vector of the satellites and the lines connecting the mobile device to the satellites for satellite 1501 and 1502, respectively. The mobile device can calculate the angles based on the devices location, the location of the satellites, and the velocity vector of the satellites. If the mobile device is stationary, the above equations are rewritten as follows:

$$f_{d1}\cos(\alpha_1) + f_0 = f_{m1}$$
$$f_{d2}\cos(\alpha_2) + f_0 = f_{m2} \quad (3)$$

The only unknown for the mobile device in these equations is $f_O$, and it can be found from each satellite equation independently. If the mobile device is stationary, the values of $f_O$ from all the acquired satellites are going to be the same. In other words, if the values of $f_O$ from equations for all the acquired satellites are not the same, the mobile device is not stationary.

Another embodiment of the disclosed subject matter relates to a method for providing characteristics of the environment of a mobile device by using WLAN-PS. WLAN APs are stationary radio transceivers with relatively small coverage, which are surveyed for positioning purposes. During the survey process, one of the characteristics associated with the WLAN APs can be characteristics of the environment. Then the detected WLAN access points by a mobile device are used collectively to determine the environment in which a mobile device is operating. The environmental characteristics can be considered as attributes of WLAN access points, for example, density of buildings near the AP height of buildings near AP, and whether the AP is in an urban canyon, urban, or suburban location. The data on the environmental characteristics of the access points can reside in the reference database of the access points and can be obtained there by the user device. The granularity of the area, which is characterized by WLAN access points, can be different, and it can be as small as a building or as big as a neighborhood. Environmental information can be used by SPS, WLAN-PS, and also an integrated solution of both systems to adjust the systems approach to position acquisition and/or for power management. For example, knowledge of the fact that a mobile device is in an urban canyon environment might cause the hybrid system to rely on WLAN-PS alone, while in a suburban environment, SPS might be considered as the primary source of estimation of position and other attributes of the mobile device.

Another embodiment of the disclosed subject matter and system provides a method to maintain the stability of the internal clock of a SPS receiver by using the WLAN APs. This can be accomplished by measuring known time intervals of the signal transmitted by a WLAN device equipped with a stable clock. Maintaining the internal clock stability of a SPS receiver is important for position determination. For example, it can help in acquiring satellite signals faster, being able to operate at lower power, and also providing a fix (location estimation) with fewer satellites. A WLAN standard defines constant time intervals, including, but not limited to, some packet headers, some fields in some packets, as in WLAN 802.11 standard DIFS (DCF Inter Frame Space), SIFS (Short Inter Frame Space), or slot duration, and a mobile device can use these known time intervals to measure its internal clock bias over time and maintain its stability.

There might be WLAN access points with different clock stability. In this case, data identifying the access points which are equipped with a stable clock can be considered as part of characteristics of the WLAN AP and/or the characteristics can reside in the access point data base and can be obtained from there.

In addition to providing initial position and clock information, the WLAN positioning system can provide clock updates to the WLAN-enabled SPS receiver. Every SPS receiver is equipped with an internal oscillator in order to maintain its indication of GPS clock information. However, because these oscillators are imperfect at maintaining an exact measurement of time, the clocks internal to the SPS receivers drift. This clock drift can cause position estimation errors. By the WLAN-PS providing the correct GPS clock information to the SPS system, the WLAN positioning system facilitates avoiding such position estimation errors. Furthermore, because the SPS receivers are able to maintain a highly accurate measure of the GPS clock information, they can operate at relatively lower signal to noise ratio (SNR) values in the position estimation calculations. Maintaining SPS timing by SPS receiver reduces time uncertainty of received signals from satellites. Therefore, it is easier to extract signal from noise, and SPS receiver can detect weaker signal and operate in harsher locations in terms of SPS signal. Thus aspects of the method allow SPS receivers to operate in areas having less that ideal SPS signal conditions.

Another embodiment of the present disclosure relates to using WLAN municipal networks to increase the accuracy of SPS receiver estimations by providing initial timing and location information to the SPS receiver. WLAN municipal networks are city wide WLAN networks which are installed in city by city officials or under their supervision to provide wireless connection using WLAN technology. Aspects of this method and system of improving SPS receiver position estimation accuracy by using WLAN municipal network data consists of the following items:

In order to assist the SPS position estimation by providing GPS clock information, the municipal WLAN access points should be synchronized with the GPS clock. WLAN access points of a municipal network can be synchronized with the GPS clock by using one of the following methods as examples: (1) use of SPS enabled WLAN APs where each WLAN AP in a municipal network can be equipped with a device which extracts the GPS clock information from GPS radio signals, (2) use of centralized clock distribution entity synchronized where the GPS clock information can be extracted at one place and then distributed to all the WLAN APs in the municipal network, and (3) use of a high quality oscillator in WLAN AP. An oscillator is used to measure time and maintain synchronization with the GPS clock. As long as the quality of the WLAN AP oscillator is higher than the SPS receiver oscillator, the timing provided by the WLAN AP is going to be higher than the SPS receiver. Therefore, the SPS receiver can use WLAN AP to maintain its timing better than using its internal clock. The single module that extracts the GPS clock information (herein "Clock Distribution Entity") is the only unit and only place which extracts the GPS clock information and then provides timing to all the WLAN access points in the network.

Further, when the WLAN receiver is integrated into the SPS receiver the SPS receiver can use the WLAN receiver to extract timing information from the signals received from WLAN access points of WLAN municipal networks. While the idea of providing initial timing to SPS receiver has been explained for WLAN municipal networks, it can be applied to any WLAN network which is synchronized to a GPS clock.

Upon review of the description and embodiments of the present invention, those skilled in the art will understand that modifications and equivalent substitutions may be performed in carrying out the invention without department from the essence of the invention. Thus the invention is not meant to be limiting by the embodiments described explicitly above and is limited only by the claims which follow. Further, the features of the disclosed embodiments can be combined, rearranged, etc., within the scope of the invention to produce additional embodiments.

What is claimed is:

1. A method of determining the location of a WLAN and satellite enabled device by using satellite measurements and satellite information to weigh WLAN access points (APs), the method comprising:

identifying WLAN APs in range of the WLAN and satellite enabled device;
retrieving location estimates of the WLAN APs;
grouping the WLAN APs into clusters of at least one WLAN AP based on the location estimates of the WLAN APs;
obtaining satellite measurements and satellite information from at least two satellites to provide a plurality of possible satellite-based locations of the device; and
providing a weight for each cluster of WLAN APs based on a distance from the clusters of WLAN APs to the nearest location among the plurality of possible satellite-based locations of the device.

2. The method of claim 1 comprising using the weight for each cluster of WLAN APs in a location algorithm to determine the location of the device.

3. The method of claim 1, wherein the plurality of possible satellite-based locations of the device comprise a region of possible location solutions for the device.

4. The method of claim 1, wherein a relatively higher weight corresponds to a cluster of WLAN APs whose location estimate is closer to the plurality of possible satellite-based locations of the device relative to the location estimates of the other clusters of WLAN APs.

5. The method of claim 4, wherein a location estimate of a cluster of WLAN APs is closer to the plurality of possible satellite-based locations of the device if the location estimate of the cluster of WLAN APs comprises a distance within about one order of magnitude of the coverage area of the cluster of WLAN APs.

6. The method of claim 1, wherein a relatively lower weight corresponds to a cluster of WLAN APs whose location estimate is farther from the satellite-based estimation of the location of the device relative to the location estimates of the other clusters of WLAN APs.

7. The method of claim 6, wherein a cluster of WLAN APs is farther from the satellite-based estimation of the location of the device if the location estimate of the cluster of WLAN APs comprises a distance about an order of magnitude above the coverage area of the cluster of WLAN APs.

8. The method of claim 6, wherein if the location estimate of the cluster of WLAN APs is determined to be farther from the plurality of possible satellite-based locations of the device, the position of the WLAN and satellite enabled device is calculated without data from the far cluster of WLAN APs.

9. The method of claim 1, wherein the weights are based on the consistency between the location estimates of the clusters of WLAN APs and the plurality of possible satellite-based locations of the device.

10. The method of claim 1, wherein the location estimates of the clusters of WLAN APs are based on characteristics of the WLAN APs of the clusters, the characteristics including at least one of received signal strength, location of the WLAN APs, signal-to-noise ratio, time of arrival, and last-known location of the WLAN APs.

11. The method of claim 1, wherein the plurality of possible satellite-based locations of the device is based on a subset of the satellite measurements and satellite information.

12. The method of claim 1, wherein the satellite measurements and satellite information is obtained from less than four satellites.

13. The method of claim 1 comprising:
eliminating, from use in determining the location of the WLAN and satellite enabled device, clusters of WLAN APs whose location estimates are not consistent with the plurality of possible satellite-based locations of the device.

14. The method of claim 13, wherein the WLAN AP cluster location consistency with the satellite measurements and satellite information is measured by applying each of the WLAN AP cluster location estimates to the satellite measurements and satellite information, and calculating the internal SPS receiver clock bias for each WLAN AP cluster location estimate.

15. The method of claim 13, comprising calculating an internal SPS receiver clock bias by considering (i) the location estimates of each cluster of WLAN APs as an initial position and (ii) the measurements and information from each satellite.

16. The method of claim 13, wherein the consistency of the internal SPS receiver clock bias for each of the WLAN AP cluster location estimates is used as an indication of distance between the WLAN AP cluster location estimate and the plurality of possible satellite-based device locations.

17. The method of claim 13, wherein calculating the consistency of the internal SPS receiver clock bias for each WLAN AP cluster location estimate comprises calculating the standard deviation or the mean square error of the internal SPS receiver clock bias.

18. A system for determining the location of a WLAN and satellite enabled device by using satellite measurements and satellite information to weigh WLAN access points (APs), the system comprising:
a hybrid positioning module comprising:
a WLAN positioning module for receiving information from one or more WLAN APs, for receiving location estimates of the one or more WLAN APs, and for grouping the WLAN APs into clusters of one or more WLAN APs based on the location estimates of the one or more WLAN APs;
a satellite positioning module for providing a plurality of possible locations of the WLAN and satellite enabled device based on satellite measurements and satellite information from at least two different satellites; and
logic contained in the hybrid positioning module for providing a weight for each cluster of WLAN APs based on the distance from the clusters of WLAN APs to the nearest location estimate among the plurality of possible satellite-based locations of the device.

19. The system of claim 18, wherein a relatively higher weight corresponds to a cluster of WLAN APs whose location estimate is closer to the plurality of possible satellite-based locations of the device relative to the other clusters of WLAN APs.

20. The system of claim 19, wherein a cluster of WLAN APs is closer to the plurality of possible satellite-based locations of the device if the location estimate of the cluster of WLAN APs comprises a distance within about one order of magnitude of the coverage area of the cluster of WLAN APs.

21. The system of claim 18, wherein a relatively lower weight corresponds to a cluster of WLAN APs whose location estimate is farther from the satellite-based estimation of the location of the device relative to the other clusters of WLAN APs.

22. The system of claim 21, wherein a cluster of WLAN APs is farther from the satellite-based estimation of the location of the device if the location estimate of the cluster of WLAN APs is at a distance about an order of magnitude above the coverage area of the cluster of WLAN APs.

23. The system of claim 22, wherein if the location estimate of the cluster of WLAN APs is determined to be farther from the plurality of possible satellite-based locations of the device, the position of the WLAN and satellite enabled device is calculated without data from the farther cluster of WLAN APs.

24. The system of claim 18, wherein the weights are based on the consistency between the location estimates of the clusters of WLAN APs and the plurality of possible satellite-based locations of the device.

25. The system of claim 18, wherein clusters of WLAN APs whose location estimates are not consistent with the plurality of possible satellite-based locations of the device are eliminated from use in determining the location of the WLAN and satellite enabled device.

26. The system of claim 24, wherein the WLAN AP cluster location consistency with the satellite measurements and satellite information is measured by applying each of the WLAN AP cluster location estimates to the satellite measurements and satellite information, and by calculating the internal SPS receiver clock bias for each WLAN AP cluster location estimate.

27. The system of claim 24 comprising calculating an internal SPS receiver clock bias by considering (i) the location estimate of each cluster of WLAN APs as an initial position and (ii) the measurements and information from each satellite.

28. The system of claim 24, wherein the consistency of the internal SPS receiver clock bias for each of the WLAN AP cluster location estimates is used as an indication of distance between the WLAN AP cluster location estimate and the plurality of possible satellite-based locations.

29. The system of claim 24, wherein calculating the consistency of the internal SPS receiver clock bias for each WLAN AP cluster location estimate comprises calculating the standard deviation or the mean square error of the internal SPS receiver clock bias.

30. The system of claim 18, wherein the location estimates of the clusters of WLAN APs are based on characteristics of the WLAN APs of the clusters, the characteristics including at least one of received signal strength, location of the WLAN AP, signal-to-noise ratio, time of arrival, and last-known location of the WLAN AP.

31. The system of claim 18, wherein the plurality of possible satellite-based locations of the device is based on a subset of the satellite measurements and satellite information.

32. The system of claim 18, wherein the satellite measurements and satellite information is obtained from less than four satellites.

* * * * *